(12) United States Patent
Touchton et al.

(10) Patent No.: US 9,175,850 B1
(45) Date of Patent: Nov. 3, 2015

(54) REACTOR SYSTEM AND METHOD

(76) Inventors: George Linton Touchton, Newark, CA (US); Charles J Coronella, Reno, NV (US)

(*) Notice: Subject to any disclaimer, the term of this patent is extended or adjusted under 35 U.S.C. 154(b) by 720 days.

(21) Appl. No.: 13/373,459

(22) Filed: Nov. 14, 2011

Related U.S. Application Data

(60) Provisional application No. 61/456,931, filed on Nov. 14, 2010.

(51) Int. Cl.
*F23C 10/22* (2006.01)

(52) U.S. Cl.
CPC ..................................... *F23C 10/22* (2013.01)

(58) Field of Classification Search
CPC ................ C07C 2/78; C10J 2300/1846; C10J 2300/1823; B01J 2208/0084; F23C 10/22
USPC ................................................. 431/2, 7, 170
See application file for complete search history.

(56) References Cited

U.S. PATENT DOCUMENTS

| | | | |
|---|---|---|---|
| 2007/0111053 A1* | 5/2007 | Penev et al. | 429/20 |
| 2007/0144940 A1* | 6/2007 | Hershkowitz et al. | 208/107 |
| 2008/0134579 A1* | 6/2008 | Kulkarni et al. | 48/73 |
| 2010/0269411 A1* | 10/2010 | Goetsch et al. | 48/204 |

* cited by examiner

*Primary Examiner* — Avinash Savani
(74) *Attorney, Agent, or Firm* — Lorraine S. Hirsch

(57) ABSTRACT

A reactor system which selectably produces from carbonaceous fuel, combined heat and power (CHP) or syngas and CHP, and in either mode a stream of greater than 95% $CO_2$ for sale or sequestration. Also included are plurality of reactors, ash separation system, and feedback control system. The reactors comprise 1) a fuel reactor selectably operated in full oxidation mode for production of CHP, or in partial oxidation mode to produce syngas to produce biofuels and CHP; 2) a burn-off reactor fully oxidizes char or carbon from the fuel reactor producing $CO_2$; and 3) an optional regeneration reactor reoxygenating oxygen carrier from the first two reactors which is returned to the fuel reactor. The feedback control system comprises an accumulator and controllable elements to apportion oxygen carrier between fuel and burn-off reactors and extract oxygen carrier and heavy ash. This ash and ash from the regenerator products are sold or disposed.

13 Claims, 12 Drawing Sheets

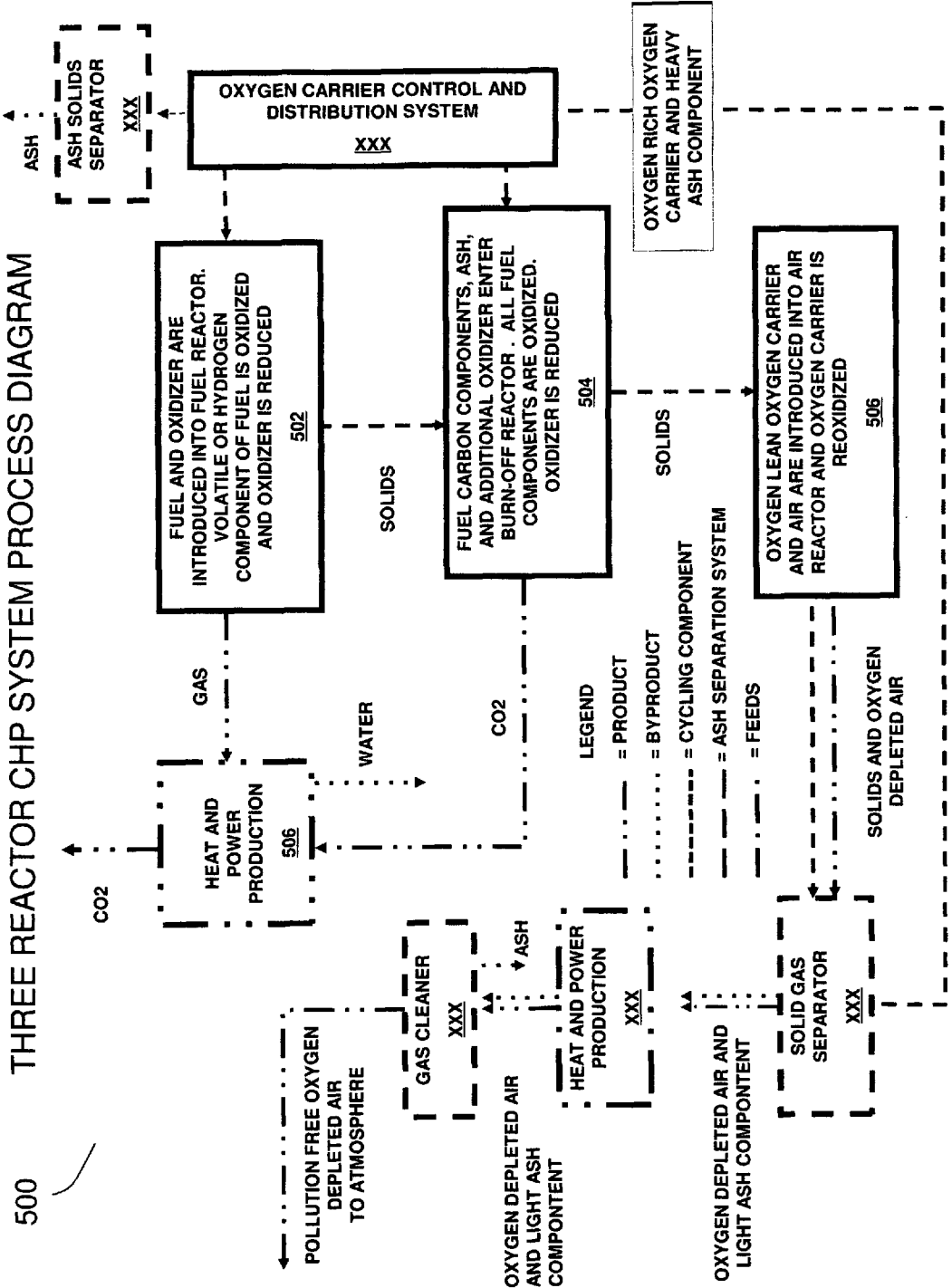

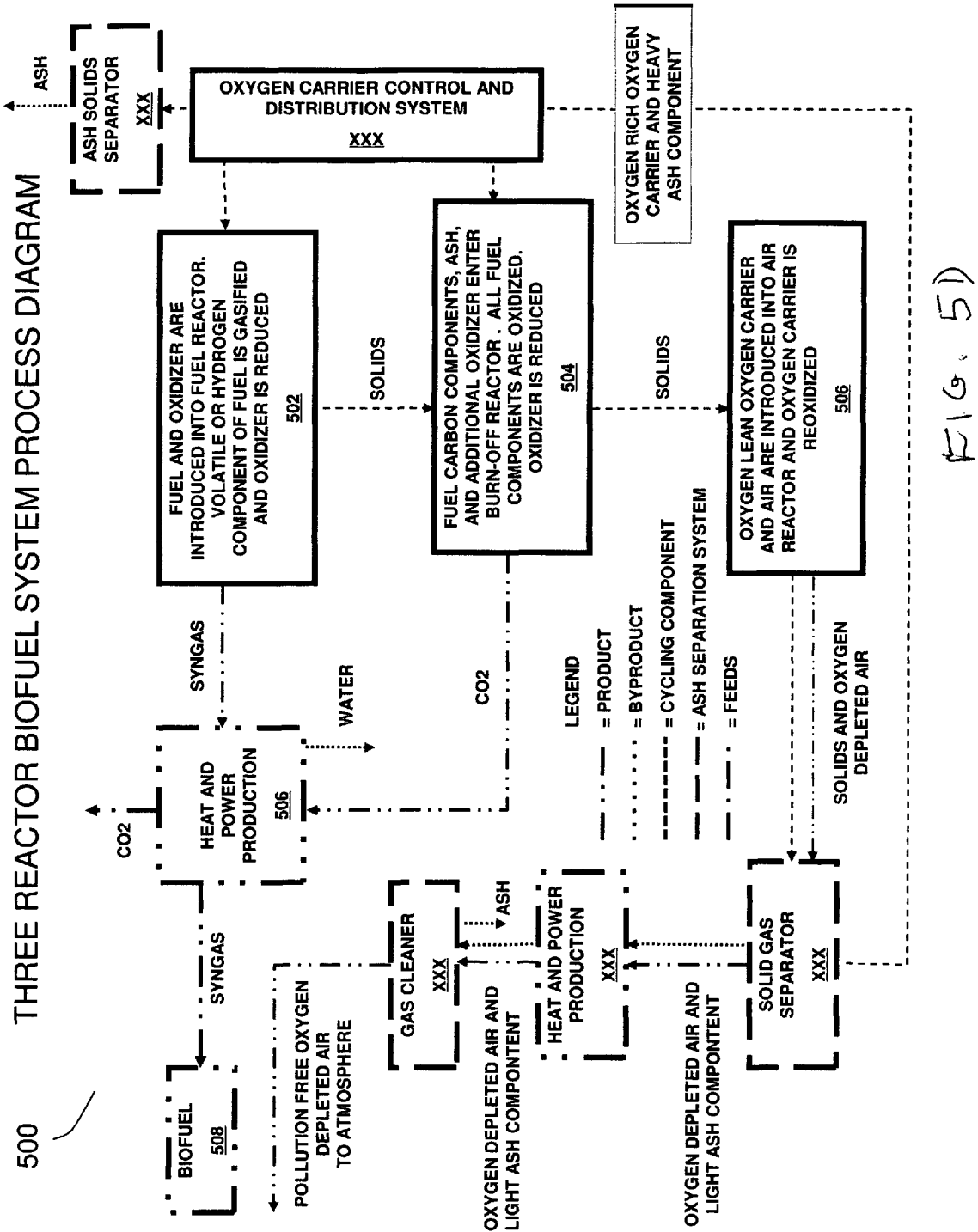

REACTOR SYSTEM AND METHOD

CROSS REFERENCE TO RELATED APPLICATION

This application claims the benefit of, and incorporates by reference, U.S. Provisional Patent Application No. 61/456,931 filed Nov. 14, 2010.

BACKGROUND

Fuel gasification and fuel full oxidation by solid state oxygen carriers use flameless technologies that require no direct contact between air and fuel. Said systems oxidize carbonaceous or hydrogen fuels using a solid compound (typically a metal oxide or peroxide) as an oxygen carrier. In past practice, the oxygen carrier is circulated between two reactors. In the first reactor the fuel is oxidized and the oxygen carrier is reduced and in the second reactor the oxygen-depleted (reduced) oxygen carrier is regenerated (oxidized) to an oxygen rich state.

SUMMARY

An oxygen carrier reactor system comprises plural distinct reactors (or reaction zones. The term "reactor" herein shall be construed to include zones where reaction takes place). Reactor I is a fuel oxidation reactor. In this reactor, the fuel is mixed with controlled amounts of an oxygen rich solid state oxygen carrier. The present fuel reactor is a system and process such that oxygen from the oxygen carrier oxidizes completely or partially the volatile component of a solid or liquid fuel or hydrogen component for a gas fuel, while non-volatile or carbon components are substantially unoxidized. An innovative single fuel reactor can be selected to operate in either of two modes, a partial-oxidation mode or a full-oxidation mode. The oxygen carrier is reduced in this process. The product stream from this reactor is substantially pure steam and carbon dioxide in full oxidation mode and a syngas with a minimum of carbon dioxide content in partial oxidation (gasifier mode). The un-oxidized component of the fuel is passed as char or carbon to a second reactor, the burn-off reactor, where it is mixed with a further controlled amount of oxygen rich oxygen carrier and oxidized completely. The burn-off reactor produces a gaseous product stream of substantially pure carbon dioxide or carbon dioxide and steam. The solids from the burn-off reactor, which are substantially reduced oxygen carrier and ash (in the case of a solid fuel), are passed to an oxygen carrier regeneration reactor where the oxygen carrier is restored to a fully oxygenated state via contact with air. The oxygenated oxygen carrier and ash mixed with the oxygen depleted air are conveyed to a separation means where the heavier solids are separated from the oxygen depleted air and ash and returned to the fuel reactor and burn-off reactor. The oxygen depleted air and ash are conveyed to a power production and ash capture section before clean oxygen depleted air is returned to the atmosphere. An innovative feedback control and oxygen rich oxygen carrier distribution system is implemented to: (1) control the amount of oxygen rich oxygen carrier admitted to the fuel reactor in a ratio to the fuel such that the reactor operates in the full oxidation, partial oxidation (gasifier), or an intermediate mode; (2) control, in fully coordinated mode with the fuel reactor control, the amount of oxygen-rich oxygen carrier admitted to the burn-off reactor in a ratio to the unoxidized char or carbon fuel components from the fuel reactor such that all these components are completely oxidized; and (3) isolate the response of the oxygen-rich oxygen carrier distribution system from supply of oxygen-rich oxygen carrier available from the regeneration reactor, such that any controlled amounts of oxygen-rich oxygen carrier demanded by the fuel reactor and burn-off reactor due to changes in load, operation mode, or both can be achieved while maintaining system stability. In a further innovation a feedback control and solid material extraction system is implemented such that a controlled portion of the oxygen carrier solids and heavier ash components circulating in the system is continuously removed. The removed oxygen carrier is cleaned, reconditioned, and returned to the system. This continuous removal and recycle system minimizes the need for prolonged system shut downs for total oxygen carrier removal and replacement. The ash component is treated and sold or disposed of. In a further innovation, a transfer system for transferring a portion of oxidized fuel makes use of an opening or openings with a profile that regulates the residence time of the fuel in the reactor by regulating the rate of flow from the reactor.

DRAWINGS

The file of this patent contains at least one drawing executed in color. Copies of this patent with color drawing(s) will be provided by the Patent and Trademark Office upon request and payment of the necessary fee.

FIG. 1 schematically depicts a reactor system by which the present system and method may be implemented.

FIG. 1A schematically depicts a separator by which the present system and method may be implemented.

FIGS. 1B and 1C schematically depict a downcomer by which the present system and method may be implemented.

FIG. 2 schematically depicts a reactor system by which the present system and method may be implemented.

FIG. 3 schematically depicts a reactor system and process by which the present system and method may be implemented, along with an example of a product table from the present system and method.

FIG. 4 schematically depicts a feedback control system by which the present system and method may be implemented.

FIGS. 5A-5F schematically depict processes and systems by which the present system and method may be implemented.

DESCRIPTION

The present description relates to technologies for gasification (partial fuel oxidation) and full fuel oxidation by solid state oxygen carriers and oxidation of solid state oxygen carriers in a reactor system for the selectable production of gases for production of heat and power or syngas for biofuels plus heat and power. In the fuel reactor, the fuel is oxidized by the oxygen carrier, which undergoes a corresponding reduction. Because the carrier-borne oxygen is used rather than the oxygen in air, it is sometimes called "air-independent oxidation (AIO)."

The oxygen-depleted carrier is then regenerated (oxidized) in another reactor, typically by exposure to the oxygen in air. The regeneration process restores the carrier to an oxygen-rich state, enabling reuse in the fuel reactor. This process is sometimes called "chemical looping combustion (CLC)."

Products from the fuel reactor can yield heat and power through a thermodynamic cycle. In existing systems, the overall system function is similar to a conventional combustor or gasifier with the advantage that the fuel reactor output flow is free of nitrogen. Because it does not require additional carbon dioxide capture units, CLC technology avoids the energy penalty that traditional fossil fuel fired combustors or gasifiers must pay to produce pure carbon dioxide. In addition, hot air from the regeneration reactor can yield heat and power through a thermodynamic cycle.

In combined heat and power (CHP) and power production alternatives to CLC using boilers, air is introduced by fans or other means to a combustion chamber. Fuel is also introduced to this chamber via pumps or other means. The chamber may be at or near atmospheric pressure or it may be pressurized. In the most common type of atmospheric boiler, just prior to entering the boiler combustion chamber, the air and the fuel are mixed in the burner.

The hot gases from combustion are nitrogen, carbon dioxide (the primary greenhouse gas or "GHG"), and water vapor, along with pollutants such as nitrogen oxides formed from the extraneous nitrogen introduced with the oxygen needed for combustion (by volume air is 80% nitrogen and only 20% oxygen), sulfur oxides formed from fuel contaminants, and carbon monoxide due to incomplete combustion. The water vapor comes both from atmospheric humidity and from combustion. The water from combustion carries with it a portion of the fuel energy which can only be regained by condensing it to a liquid.

The hot post-combustion gases are carried up by their buoyancy and pass through various heat exchange systems that boil the feedwater forming steam. Other heat exchange means superheat the steam. The cooled exhaust gases are then treated or exhausted to the atmosphere.

In an atmospheric fluidized bed boiler, the process is the same except that the fuel and air are mixed in, and combustion occurs in the bed of solids which is fluidized by their passage. A pressurized fluidized bed boiler is similar except that the entire process is contained in a pressurized vessel, and the entering and exiting stream are pressurized. The pressurization reduces the volume of the gases and therefore the size of the equipment needed.

Existing external combustion boiler technologies have numerous problems and shortcomings, many related to the extraneous nitrogen involved. The nitrogen: 1) requires major components (ducts, fans, the boiler itself, post combustion pollution treatment equipment) to be greatly oversized; 2) requires energy to supply it to the process (especially for a pressurized process); 3) carries energy away in the exhaust, as explained more fully below; and 4) results in pollutant (nitrogen oxides) formation.

"Oxy fuel" combustion is an existing technology that partially addresses the issues of energy waste via exhaust. In this process, oxygen from an air separation plant is supplied to the combustion. Two types of air separation processes are cryogenic and pressure swing adsorption (PSA).

Gasification is a technology used to convert a solid fuel into a synthesis gas ("syngas") that can then be used for other downstream uses such as power production or biofuels production. In the case of power production the syngas is often used as fuel for a gas engine. In the case of biofuel production, the syngas is sent to a catalytic or other process that converts the syngas to liquid fuel products such as mixed alcohols, methanol, ethanol, or through subsequent process to gasoline. Syngas can also be sent to processes such as Fischer Tropsch to produce diesel fuel.

For catalytic processes that convert syngas into fuel, the composition of the syngas is a major factor in the efficiency and life of the conversion catalyst. Many of these catalysts become much less efficient and can be deactivated by high concentrations of carbon dioxide, a major component syngas. In addition, many existing gasifiers generate a high content of tar that can also poison the catalyst.

What is needed is a reactor system that is able to be used to (1) fully oxidize fuel-producing products, including a stream of substantially pure carbon dioxide, for power production, and (2) operate as a gasifier producing syngas for production of biofuels while minimizing carbon dioxide and regulating concentrations of other components in the syngas; producing a stream of substantially pure carbon dioxide; solving problems with using solid fuel vs. gaseous fuel; improving gasification for biofuel production; and that accomplishes these goals with low or no tar formation.

FIG. 1 schematically depicts a system 100 for the selectable production of gases for production of heat and power or syngas for biofuels plus heat and power. In either mode, a separate stream comprising greater than 95% $CO_2$ or $CO_2$ and steam by volume is produced. The $CO_2$ may be recovered from the stream of $CO_2$ and steam by condensing the steam resulting in a stream of greater than 95% $CO_2$ by volume. The apparatus and method consist of three or more reactors which are arranged and operate as follows. A fuel reactor 101 is arranged so that a carbonaceous fuel 106 which has been treated (as explained in *Biomass Gasification and Pyrolysis: Practical Design and Theory*, by P. Basu, Academic Press, 2010 for example) to satisfy the requirements of the reactor with regard to variables (e.g., moisture content less than 40% by weight, particle effective diameter 1 millimeter or less, in one embodiment) is introduced by a feeder (including, but not limited to screw feeders, chain feeders, and slurry pumps) through a pipe 107. In the reactor the fuel is mixed and distributed in a fluidized bed 102.

Fuel reactor 101, a bubbling fluidized bed in one embodiment, is arranged to admit a solid, liquid or gaseous, carbonaceous fuel 106, which has been treated to satisfy the requirements of the reactor for solid carbonaceous feed particles in the size range of 0.5 to 50 millimeters (with a diameter of 5 millimeters in one embodiment), and moisture content in the range of 4 to 40 weight percent (with a moisture content of 4 weight percent in one embodiment). Said carbonaceous fuel is introduced by a feeder that includes, but is not limited to, screw feeders, chain feeders, blowers, and pumps. In the reactor the fuel is mixed with the bubbling fluid bed 211. Said fluid bed consists of particles in the size range of 100 to 1200 micrometers, with a diameter size of 300 micrometers in a preferred embodiment. Each of said particles is composed of chemically active metal oxides or peroxides chosen from the set of copper oxides, manganese oxides, and barium peroxides. Said oxides (copper oxides in one embodiment) are dispersed throughout and bound to each particle of a support material such as γ alumina, titanium dioxide, or Yttria stabilized zirconia which provides mechanical strength, toughness, and resistance to wear and attrition as the particles are transported around the system. Said particles are suitable for use in past practice chemical looping systems as well as the present novel system.

A fluidizing gas 108 which provides the motive volume and velocity required for bed fluidization is introduced via a pipe 109 creating a fluidized bed 102 of admixed fuel, oxygen rich oxygen carrier, and solid reaction products. The use of both atmospheric pressure and pressurized fluid bed technologies in chemical processes and combustion are well known to those skilled in the art. Pressurized fluid bed technology has been demonstrated and offered for sale at commercial scale. The Tidd Pressurized Fluidized Bed Combustion (PFBC) project. [Anon., "Tidd PFBC Demonstration Project Final Report," U.S. Department of Energy Contract No. DE-FC21-87 MC-24132.000, August, 1995. and Hatazaki, H., et al, "Development and Construction of World Largest 360MW PFBC Having Hexagon Shaped Furnace," The Japanese Society of Mechanical Engineers, 1996. Many applications of both pressurized and atmospheric pressurized fluid bed technology are described in the work by Kunii and Levenspiel (Kunii Daizo, and Levenspiel, Octave. *Fluidization Engineering*. 2nd ed., Butterworth-Heinemann, Boston, Mass., (1991)). The fluidizing gas is steam in one embodiment, but may consist of other gases, such as carbon dioxide, or mixtures of gases. The bed material is separated from the fluidizing gas expansion chamber 104 and supported by a distribution plate 103 which also serves to distribute the fluidizing gas evenly across the fluidized bed. In the fluidized bed, the metallic oxide or peroxide reacts with and gives up oxygen to the fuel. The net process is the oxidation of the fuel to gaseous products and ash while some or all of the copper oxide is reduced to copper. The oxygen carrier substrate is unchanged in the reaction. Some or all of the bed material is entrained in the gaseous products and is conveyed by them into an upper reactor space 158. These gases and solids are then directed by a duct 148 into a separator 150 for separating the solids from the gases. Separator 150 is a cyclonic separator in one embodiment.

The cyclonic separator or other separation means separates the solids from the gases by centrifugal forces and causes their conveyance by a pipe 151 back to the fuel reactor 101.

As a consequence of the addition of carbonaceous fuel and oxygen rich oxygen carrier the height of the bed 102 tends to increase. The height of the bed is controlled by a downcomer 105 which removes a controlled portion of the bed material to maintain the desired height and therefore residence time in the bed. A novel flow area entrance 170 to the downcomer 105, shown in FIG. 1B, is provided such that the flow area available to the flow out of the reactor bed is a desired function of the bed height. This means is chosen from the set of a single and a multiplicity of slots 170. When said slot or slots are formed in one embodiment with profiled sides 171 said profile is chosen such that the flow area and therefore the downcomer flow varies with bed height such that the residence time, the average time spent by a particle in the reactor, can be controlled. An example of such a control system is that the residence time is constant as solids flow through the reactor changes. As a further illustration, for some weirs and slots, flow through the slot varies as bed height above the slot base 172 raised to the 3/2 power. For this functional dependence of flow with bed height and a slot profile as shown in FIG. 1B, the bed residence time will be constant with regard to total flow into the bed and with regard to any individual flow into the bed for bed heights greater than the distance 173 from the distribution plate 103 to the slot base 172. Thus there is a minimum mass flow through the reactor above which the residence time is controlled. The functional form of the residence time variation with flow may be controlled to other than constant form, linear for example, by applying different profiles to the slot opening. As will be appreciated by those skilled in the art, slot profiles will be tailored to desired results, and such methods and results are within the scope of this invention. Thus through the present means, the reactor bed residence time may be controlled as a function of any desired reactor flow variable such as one or more reactor flows or a function thereof. Reactor flow variables can include, but are not limited to, oxygen-rich oxygen carrier and carbonaceous fuel in one embodiment. The independent variable may be chosen from a set including, but not limited to, the ratio of oxygen rich oxygen carrier flow to fuel flow, oxygen rich oxygen carrier flow, and fluidizing fluid flow. In a further feature of this means, the height of the downcomer which is free of any flow openings 174 is set to maintain a minimum reactor fluidized bed height at which bed fluidization can be stably and reliably maintained. The bed material entering the burn-off reactor 110 via downcomer 105 includes a portion of the introduced oxygen rich oxygen carrier, oxygen lean oxygen carrier, substantially all of the carbonaceous component of the fuel as char, and ash. It is substantially free of the gaseous products of the reaction of the hydrogen component of the fuel.

In the burn-off reactor 110, oxygen rich oxygen carrier is admitted at a controlled rate via a pipe 141. In one embodiment, the rate is controlled via an L Valve 165, by controlling the pressure and flow of a motive fluid 142 through an aeration pipe 143. The ratio of the char, any other unoxidized fuel components, and fuel to the oxygen rich oxygen carrier in the bed is maintained at or above the minimum value required for complete oxidation. The height of a fluidized bed 111 is controlled via a downcomer 113. A novel entrance 175 to the downcomer 113, shown in FIG. 1C, is provided such that the flow area available to the flow out of the reactor bed is a desired function of the bed height. This means is chosen from the set of a single and a multiplicity of slots 175 in one embodiment. When said slot or slots are formed in one embodiment with profiled sides 176 said profile chosen such that the flow area and therefore the downcomer flow varies with bed height such that the residence time, the average time spent by a particle in the reactor, can be controlled. One example of such a control is that the residence time is constant as solids flow through the reactor changes. As an example, for some weirs and slots, flow through the slot varies as bed height above the slot base 177 raised to the 3/2 power. For this functional dependence of flow with bed height and a slot profile as shown in FIG. 1C, the bed residence time will be constant with regard to total flow into the bed and with regard to any individual flow into the bed for bed heights greater than the distance from the distribution plate 112 to the slot base 177. Thus there is a minimum mass flow through the reactor above which the residence time is controlled. The functional form of the residence time variation with flow may be controlled to other than constant form, linear for example, by applying different profiles to the slot opening depending on desired characteristics, as will be appreciated by those skilled in the art, and such methods and results are within the scope of this invention. Thus through the present means, the reactor bed residence time may be controlled as a function of any desired reactor flow variable such as one or more reactor flows or a function thereof; chosen from the set including, but not limited to oxygen rich oxygen carrier and carbonaceous fuel in one embodiment. The independent variable may be chosen from a set including, but not limited to, the ratio of oxygen rich oxygen carrier flow to fuel flow, oxygen rich oxygen carrier flow, and fluidizing fluid flow. In a further feature of this means, the height of the downcomer which is free of any flow openings 179 is set to maintain a minimum reactor fluidized bed height at which bed fluidization can be stably and reliably maintained. This system and process is designed and operated to completely oxidize all char and any other fuel or fuel components so that material leaving the bed via a downcomer 113 is substantially composed of oxygen lean oxygen carrier admixed with oxygen rich oxygen carrier and ash. The bed 111 is maintained in a fluidized state via a fluidizing fluid 114, carbon dioxide in one embodiment, admitted via pipe 115 into an expansion space 116. This fluid is then distributed by a distributor plate 112 uniformly across the face of the fluid bed. The gaseous products 115 of the oxidation mixed with the fluidizing fluid, flow into the head space 157 of the burn-off reactor and from there to a heat exchange means 159, continuous tube banks in one embodiment, arranged in the bed and head space of the fuel reactor.

When the fuel reactor is operating in other than full oxidation mode, this heat exchange means supplies the heat required to maintain the endothermic gasification reactions. When the fuel reactor is operating in full oxidation mode heat is released by the oxidation reaction and the heat exchange means serves as a pipe or duct only. The burn-off reactor bed material conducted by downcomer 113 flows into an oxygen carrier regeneration reactor 117, where the solids are dispersed and mixed in a fluidized bed by a fluidizing agent 120 (compressed air in one embodiment), which has been introduced via a pipe 121. The bed material 118 in the regeneration reactor 117 is separated from the fluidizing gas expansion chamber 122 and supported by a distribution plate 119 which also serves to distribute the fluidizing gas evenly across the fluidized bed.

In the oxygen-carrier regeneration reactor 117, an oxygen carrier (such as copper metal dispersed on a carrier particle), reacts with, and is oxidized by the oxygen in air to copper oxides. The substrate particle is not changed in the reaction.

Some or all of the bed material is entrained in the gaseous product hot oxygen depleted air and is conveyed with the aid of secondary air 128 introduced through a pipe 129 from an upper reactor space 156 of the regeneration reactor 117. These gases and solids are then directed by a duct 132 and 133 into a separator 134, a cyclonic separator in one embodiment, where the solids are separated from the gases by centrifugal forces and are conveyed down through the cyclonic separator converging section 134A through a duct 161 into a material accumulator 162. The oxygenated oxygen carrier then passes into a solids-flow regulating means.

The means for separating solids, including heavier ash components, from the lighter ash components, 167 and the solids flow regulating system, 168 are shown in an expanded view FIG. 1A where like numbers correspond to like features.

This solids-flow regulating means is an L-Valve system 168 in one embodiment. Said system comprises an upper L-Valve component 164 including a downcomer 132, and an aeration tube 138. As is well known in the art, the amount of solid particles which flow through said L-Valve and into conveying pipe 136 can be regulated by varying the amount of gas 137, for example steam in one embodiment, introduced through the aeration tube 138. Greater aeration gas pressure and flow result in greater solids flow. The oxygenated oxygen carrier is then introduced to the fuel reactor through a pipe 136 in accordance with the desired ratio to the carbonaceous fuel 106. This ratio is controlled so that in oxy-fuel mode it is above the minimum required for full oxidation and in gasification mode, it is below the maximum required for partial oxidation of the volatile or hydrogen fuel component. In transition mode it is changed in a controlled manner to move from one of said modes to the other.

A portion of the oxygenated oxygen carrier along with ash constituents bypasses a first L-Valve component 164 and flows through an opening 139 into a second L-Valve component 165. There a controlled portion of the flow is directed via motive fluid 142 via aeration tube 143, steam in one embodiment, into duct 141 and into the burn off reactor 110 to provide the oxygen rich oxygen carrier in a controlled ratio to the char, unreacted fuel, and other unreacted fuel components exiting the fuel reactor 101 via downcomer pipe 105. This ratio is controlled and maintained above a minimum needed for full oxidation of all char, unreacted fuel, and other unreacted fuel components.

In a further feature, a portion of the bed material bypasses the second L Valve component 165, and flows into a third L Valve component 166, through an opening 163. A controlled portion of this bed material is extracted via a third L-Valve assembly 166. The amount of extracted material is controlled by varying the pressure and volume of the aeration gas 124, steam in one embodiment, admitted through the L-Valve aeration tube 125.

The material 127 that is pushed through a pipe 126 and extracted for treatment consists primarily of oxygenated oxygen carrier and heavier ash components. This oxygenated oxygen carrier is separated from the ash using conventional means. Some ash components such as potassium salts are valuable as additives to fertilizer and can be sold. Others such as sodium salts are sent to disposal. The clean reclaimed oxygen carrier 130 is recycled to the system through pipe 131.

One example of operating parameters of the fuel oxidation reactor 101 for a pressurized embodiment show that said parameters depend upon whether the system has been selected to operate in partial oxidation (gasification) or full oxidation (oxy-fuel mode):

| Fuel Oxidation Reactor Conditions Active Oxygen Carrier = CuO and $Cu_2O$ | | |
|---|---|---|
| | Gasification Mode | Oxy-fuel Mode |
| Temperature | 700° C. | 875° C. |
| Pressure | 20 atmospheres | 20 atmospheres |
| Fuel to Active Components of Oxygen Rich Carrier | 0.44 kg/kg | 0.22 kg/kg |
| Oxygen Rich Carrier in Accumulator per kg of Fuel | 4 kg/kg | 0 kg/kg |
| Product Gas Composition | $CO_2$, steam, trace gases | $CO_2$, CO, H2 and trace gases |
| CO | 31% volume dry | 18 ppmd |
| $CO_2$ | 14% volume dry | 98% volume dry |
| $H_2$ | 52% volume dry | 41 ppmvd |
| Steam | 14% volume wet | 60% volume wet |
| Trace Gases | 3% volume dry | 2% vd including CO + $H_2$ |

The typical operating conditions of the burn-off reactor 110 for a pressurized embodiment are substantially the same whether the system and process is in partial oxidation (gasification) or full oxidation (oxy-fuel mode):

| Burn-off Reactor Conditions Active Oxygen Carrier = CuO and $Cu_2O$ | | |
|---|---|---|
| | Gasification Mode | Oxy-fuel Mode |
| Temperature | 875° C. | 875° C. |
| Pressure | 20 atmospheres | 20 atmospheres |
| Solids from FR/ Oxygen Carrier | 0.05 kg/kg | 0.09 kg/kg |
| Product Gas Composition | $CO_2$, steam, trace gases | $CO_2$, CO, H2 and trace gases |
| CO | less than 1 ppmd | less than 1 ppmd |
| $CO_2$ | greater than 99% volume wet | greater than 99% volume wet |
| $H_2$ | less than 1 ppmd | less than 1 ppmd |
| Steam | less than 1% volume wet | less than 1% volume wet |
| Trace Gases | less than 1% volume dry | less than 1% volume dry including CO + $H_2$ |

The gaseous products 153, from the fuel reactor 101 leave the gas solid separator 150 via the duct 152. The gaseous products 155 from the burn-off reactor 110 leave via a duct 159, flow through the heat exchanger 160 and duct 154. The oxygen depleted air 147 from the oxygen carrier regeneration reactor 117 leaves the gas solid separator 134 via the duct 144. Any solid components of the stream are removed via known separation methods such as electrostatic precipitation 145.

The solid free oxygen depleted air 147 is then exhausted or sent to further processes via a ducting mean 146.

The hot high-pressure fuel reactor product stream is used for power production using the same equipment for both modes. If the system is operating in gasification mode, the post-power and heat production, cooled, reduced pressure, syngas product stream is sent to a downstream catalytic process for the production of biofuels. By means of the process and systems described above, substantially the entire carbon component of the fuel is conveyed as char into the burn-off reactor. This minimizes the carbon dioxide content of the syngas, and increases the efficiency and biofuel product production of the syngas to liquid biofuel process. When operating in oxy-fuel mode, the cooled reduced pressure product stream consisting substantially of steam, and trace gases with a minimum of carbon dioxide, is sent to a condensing scrubber where the stream is condensed and the trace gases are removed with this condensate. The resulting stream of essentially pure carbon dioxide is mixed with the carbon dioxide from the burn-off reactor.

The burn-off reactor gaseous products is substantially pure carbon dioxide in one embodiment where carbon dioxide is used as the fluidizing fluid. This carbon dioxide is mixed with the aforesaid carbon dioxide from the fuel reactor and is liquefied for sale or sequestration. The electric energy and heat production equipment is the same for both gasification and oxy-fuel operation with the exception of the scrubbing condenser and carbon dioxide liquefaction equipment. Thus, greater than 95% (on a cost basis) of the plant is common to the two modes of operation.

The hot, high-pressure carbon dioxide stream is also used for the production of electric power and heat utilizing means including but not limited to, turbo-expanders, heat-recovery steam generators, gas compressors, gas turbines, and thermoelectric generators. In one embodiment, the turbo-expander is coupled to a carbon dioxide compression means to provide the compressed carbon dioxide needed to operate the burn-off reactor.

The hot, high pressure oxygen depleted air stream may also be used for the production of electric power and heat utilizing existing means such as turbo-expanders, and heat recovery steam generators. The turbo-expander is coupled to an air compression means to provide the compressed air needed to operate the oxygen carrier regeneration reactor.

The means and equipment used for compression and for power generation and heat production is completely common to both modes of operation, since the oxygen carrier regeneration reactor operation is essentially the same for both modes.

In at least one embodiment, the reactor system is entirely self-sustaining on an energy basis. In oxy-fuel and gasification mode both reactors generate high temperature and pressure products for heat and power generation. In gasification mode, the fuel reactor is operated at the same or a lower temperature, 700 C in one example, relative to the oxygen carrier regeneration reactor, 875 C in the example. The solid oxygen carrier flowing from the oxygen carrier regeneration reactor give up sensible heat to the fuel reactor providing some of the energy need for gasification of the fuel. The remainder of the energy is provided by heat transfer from the gaseous products from the burn-off reactor. This method and process is superior to conventional oxygen blown gasification, since the carbon dioxide does not mix with and contaminate the syngas product stream.

The method and means for switching between the two modes is to vary the amount of oxygen rich oxygen carrier stored in the accumulator 162 by varying the amount and pressure of the steam introduced through aeration pipes 137 and 142. This method also controls the amount of solid material circulating in the fuel, burn-off and oxygen carrier regenerator loop, which is easily seen to be the total solids circulating in the system minus the solids stored in the accumulator. The amount of active components of solids circulating in the system, and the amount of active components (copper oxides in one embodiment) of oxygen rich oxygen carrier stored in the accumulator for both modes of operation is shown above.

Operating conditions of the oxygen carrier regeneration (air) reactor are essentially the same for either fuel oxidation mode:

| Oxygen Carrier Regeneration Reactor Active Oxygen Carrier = CuO and $Cu_2O$ | | |
|---|---|---|
| | Gasification Mode | Oxy-fuel Mode |
| Temperature | 875° C. | 875° C. |
| Pressure | 20 atmospheres | 20 atmospheres |
| Air to Active Components of Oxygen Depleted Carrier Ratio* | 4.3 kg/kg | 3.4 kg/kg |
| Product Gas Composition** | | $O_2$ and $N_2$ |
| $O_2$ | 16.5% volume dry | 16.6% volume dry |
| $N_2$ | 83.5% volume dry | 84.4% volume dry |

*Note: Includes air required for heat balance as well as air required for oxygen carrier regeneration
**Note: These compositions do not include the trace amounts of water, argon, and $CO_2$ which enter with the ambient air.

FIG. 2 schematically depicts a system 200 for the selectable production of gases for production of heat and power or syngas for biofuels plus heat and power. In either mode, producing a separate stream consisting of greater than 95% $CO_2$ or $CO_2$ and steam by volume. The $CO_2$ may be recovered from the stream of $CO_2$ and steam by condensing the steam resulting in a stream of greater than 95% $CO_2$ by volume. The apparatus and method can consist of three or more reactors which are arranged and operated as follows:

A fuel reactor 212, a circulating fluidized bed in one embodiment, is arranged so that a solid, liquid or gaseous, carbonaceous fuel 208, which has been treated to satisfy the requirements of the reactor for biomass feed particles in the size range of 0.5 to 50 millimeters (with a diameter of 5 millimeters in one embodiment), moisture content in the range of 4 to 40 weight percent (with 4 weight percent in one embodiment). The carbonaceous fuel is introduced by a feeder such as (by way of example but not limited to), screw feeders, chain feeders, and pumps, through a pipe 210 at a rate controlled by a valve 209. In the reactor the fuel is mixed with a dispersed circulating fluid bed 211. Said fluid bed consists of particles in the size range of 100 to 1200 300 micrometers, with 300 micrometers being used in one embodiment. Each of said particles is composed of chemically active metal oxides or peroxides chosen from the set of copper oxides, manganese oxides, and barium peroxides. Said oxides (copper oxides in one embodiment) are dispersed throughout and bound to each particle of a support material such as γ alumina, titanium dioxide, or Yttria stabilized zirconia which provides mechanical strength, toughness, and resistance to wear and attrition as the particles are transported around the system.

A fluidizing gas 201, which provides the flow rate and velocity required for bed fluidization, is introduced via pipes 202 and 206 at a rate controlled by valve 203 creating a fluidized bed of solids 211 comprising admixed fuel, oxygen rich oxygen carrier, and solid reaction products. Said gas is steam in one embodiment, but may consist of other gases, such as carbon dioxide, or mixtures of gases. The bed material is separated from the fluidizing gas expansion chamber 207 and supported by a distribution plate 205 which also serves to distribute the fluidizing gas evenly across the fluidized bed. In the fluidized bed, the metallic oxide or peroxide reacts with and gives up oxygen to the fuel. Through systems and processes explained below, the net process is the oxidation of the hydrogen component of the fuel to gaseous products while some or all of the copper oxide is reduced to copper. The oxygen carrier substrate is unchanged in the reaction. The circulating bed material and the gaseous products are conveyed into an upper reactor space 213. These gases and solids are then directed by a duct 214 into a means for separating the solids from the gases 215. This separation means 215 is a cyclonic separator in one embodiment. The cyclonic separator separates the solids from the gases by centrifugal forces and causes their conveyance by pipe 218 into a burn-off reactor 260. The bed material entering the burn-off reactor by pipe 218 includes a portion of the introduced oxygen rich oxygen carrier, reduced oxygen lean oxygen carrier, substantially all of the carbonaceous component of the fuel as char, and ash. It is substantially free of the gaseous products of the reaction of the hydrogen component of the fuel.

In the burn-off reactor 260, oxygen rich oxygen carrier is admitted at a controlled rate via pipe 223. In one embodiment, the rate is controlled via an L-Valve assembly 257, by controlling the pressure and flow of motive fluid 227 through aeration pipe 226. Through these means, the ratio of the char plus any other unoxidized fuel components to the oxygen rich oxygen carrier in the bed is maintained at or above the minimum value required for complete oxidation. The height of the bed is controlled via the downcomer 219 and the residence time of reactants in the bed is set by the rate of admission of the material entering the bed via pipes 218 and 223 and the rate of material leaving via the downcomer 219. A novel entrance 176 to the downcomer 219, similar to that shown in FIG. 1C, is provided such that the flow area available to the flow out of the reactor bed is a desired function of the bed height. This means is chosen from the set of a single and a multiplicity of slots 176 in one embodiment. When said slot or slots are formed in one embodiment with sides 176 with a profile as shown in FIG. 1C, the bed residence time in the bed is constant with regard to total flow into the bed and with regard to any individual flow into the bed. The functional form of the residence time variation with flow may be controlled to other than constant form, linear for example, by applying different profiles to the slot opening, as will be appreciated by those skilled in the art, and are within the scope of this invention. Thus through the present means, the reactor bed residence time may be controlled as a function of any desired reactor flow variable such as one or more reactor flows or a function thereof, chosen from the set including, but not limited to oxygen rich oxygen carrier and carbonaceous fuel in one embodiment. Various reactor bed residence times may be achieved by various slot shapes. The independent variable may be chosen from a set including, but not limited to, the ratio of oxygen rich oxygen carrier flow to fuel flow, oxygen rich oxygen carrier flow, and fluidizing fluid flow. In a further feature of this means, the height of a downcomer which is free of any flow openings is set to maintain a minimum reactor fluidized bed volume at which bed fluidization can be stably and reliably maintained. Through these systems and process all char and any other fuel or fuel components are completely oxidized so that the material leaving the bed via downcomer 219 is substantially composed of oxygen lean oxygen carrier, oxygen rich oxygen carrier, and ash. The bed 220 is maintained in a fluidized state via a fluidizing fluid 225, carbon dioxide in one embodiment, admitted via a pipe 224 into an expansion space 261. This fluid is then distributed by distributor plate 262 uniformly across the face of the fluid bed. The gaseous products of the oxidation mix with the fluidizing fluid 225, and flow into burn-off reactor head space 259 and from there to a heat exchange means via pipe 222. In the one embodiment, the heat exchange means is comprised of continuous tube banks 204 arranged in the bed and head space of the fuel reactor 212. When the fuel reactor is operating in other than full oxidation mode, this heat exchange means supplies some or all of the heat required to maintain the endothermic gasification reactions. When the fuel reactor is operating in full oxidation mode heat is released by the oxidation reaction and the heat exchange means serves as a piping or duct only.

The burn-off reactor bed material 220 flows through a downcomer 219, via a pipe 229, and into the oxygen carrier regeneration reactor 237, where the solids are dispersed and mixed with a circulating fluidized bed. The bed is fluidized by the fluidizing agent 230, compressed air in one embodiment, which has been introduced via a pipe 231. The bed material 236 in regeneration reactor 237 is separated from the fluidizing gas expansion chamber 232 and supported by a distribution plate 233 which also serves to distribute the fluidizing gas evenly across the fluidized bed.

In the oxygen carrier regeneration reactor, the oxygen lean oxygen carrier, copper metal dispersed in and bound to a carrier particle in the one embodiment, reacts with, and is oxidized by the oxygen from air to copper oxides. The substrate particle is not changed in the reaction.

Some or all of the bed material is entrained in the fluidizing compressed air and the product hot oxygen depleted air is circulated to an upper reactor space 238 of the regeneration reactor 237. These gases and solids are then directed by duct 239 into a separation means 240, a cyclonic separator in one embodiment, where the gases and lighter ash components are separated by centrifugal forces from the remaining solids, substantially composed of oxygenated oxygen carrier and heavier ash components. These solids are conveyed down through the cyclonic separator converging section 134A through duct 243 into a solids flow regulating system. This solids-flow regulating means is comprised of a material accumulator 256, an L-Valve component 257, a second L-Valve component 245 and a third L-Valve component 255. These components are operated in a coordinated control manner to achieve regulated flows of oxygen rich oxygen carrier to the burn-off reactor, fuel reactor, and solids extraction and treatment system respectively. The upper L-Valve component 257 comprises a downcomer 258, and an aeration tube 226. The amount of solid particles which flow through said L-Valve and into conveying pipe 223 can be regulated by varying the flow rate and pressure of a gas 227, for example steam in one embodiment, introduced through aeration tube 226. Greater aeration gas pressure and flow result in greater solids flow. The oxygenated oxygen carrier is then introduced to the burn-off reactor 260 through a pipe 223 to provide the oxygen-rich oxygen carrier in a controlled ratio to the char, unreacted fuel, and other unreacted fuel components exiting the fuel reactor via a pipe 218. This ratio is controlled and maintained above a minimum needed for full oxidation of all char, unreacted fuel, and other unreacted fuel components.

A portion of the oxygenated oxygen carrier along with ash constituents bypasses the first L-Valve component 257 and flows through an opening 228 into a second L-Valve component 245. There a controlled portion of the flow is directed via motive fluid 246, steam in one embodiment, into duct 248 and into the fuel reactor 212 in a ratio to the carbonaceous fuel 208. This ratio is controlled so that in oxy-fuel mode it is above the minimum required for full oxidation and in gasification mode, it is below the maximum required for partial oxidation of the volatile or hydrogen fuel component. In transition mode it is changed in a controlled manner to move from one of said modes to the other.

In a further feature, a portion of the bed material is extracted via another L-Valve assembly 255. The amount of extracted material is controlled by varying the pressure and volume of the aeration gas 251, steam in one embodiment, admitted through L-Valve aeration tube 252.

The material 254 extracted for treatment consists primarily of oxygenated oxygen carrier and heavier ash components. This oxygenated oxygen carrier is separated from the ash using conventional means. Some ash components such as potassium salts are valuable as additives to fertilizer and can be sold. Others such as sodium salts are sent to disposal. The clean reclaimed oxygen carrier 234 is recycled to the system through a feed pipe 235.

The operation and features of the present system and process may be further understood by an example of system operation conditions, as follows:

The typical operating conditions of the fuel reactor 212 for one pressurized embodiment depend upon whether the system and process is in partial oxidation (gasification) or full oxidation (oxy-fuel mode):

| Fuel Oxidation Reactor Conditions<br>Preferred Active Oxygen Carrier = CuO and Cu$_2$O | | |
|---|---|---|
| | Gasification Mode | Oxy-fuel Mode |
| Temperature | 700° C. | 875° C. |
| Pressure | 20 atmospheres | 20 atmospheres |
| Fuel to Active Components of Oxygen Rich Carrier | 0.44 kg/kg | 0.22 kg/kg |
| Oxygen Rich Carrier in Accumulator per kg of Fuel | 4 kg/kg | 0 kg/kg |
| Product Gas Composition | CO$_2$, steam, trace gases | CO$_2$, CO, H2 and trace gases |
| CO | 31% volume dry | 18 ppmd |
| CO$_2$ | 14% volume dry | 98% volume dry |
| H$_2$ | 52% volume dry | 41 ppmvd |
| Steam | 14% volume wet | 60% volume wet |
| Trace Gases | 3% volume dry | 2% vd including CO + H$_2$ |

The typical operating conditions of the burn-off reactor 260 for one pressurized embodiment are substantially the same whether the system and process is in partial oxidation (gasification or full oxidation (oxy-fuel mode):

| Burn-off Reactor Conditions<br>Preferred Active Oxygen Carrier = CuO and Cu$_2$O | | |
|---|---|---|
| | Gasification Mode | Oxy-fuel Mode |
| Temperature | 875° C. | 875° C. |
| Pressure | 20 atmospheres | 20 atmospheres |
| Solids from FR/ Oxygen Carrier | 0.05 kg/kg | 0.09 kg/kg |
| Product Gas Composition | CO$_2$, steam, trace gases | CO$_2$, CO, H2 and trace gases |
| CO | less than 1 ppmd | less than 1 ppmd |
| CO$_2$ | greater than 99% volume wet | greater than 99% volume wet |
| H$_2$ | less than 1 ppmd | less than 1 ppmd |
| Steam | less than 1% volume wet | less than 1% volume wet |
| Trace Gases | less than 1% volume dry | less than 1% volume dry including CO + H$_2$ |

Gaseous products 217 from the fuel reactor 212 leave the gas solid separation means 215 via the duct 216. Gaseous products 264 leave the burn-off reactor 260 via duct 222, flow through the heat exchanger 204 and duct 263. The oxygen-depleted air 242 from the oxygen carrier regeneration reactor 237 leaves gas-solid separator 240 via a duct 241.

The hot high-pressure fuel reactor product stream is used for power production using the same equipment for both modes. If the system is operating in gasification mode, the post-power and heat production, cooled, reduced pressure, syngas product stream is sent to a downstream catalytic process for the production of biofuels. By means of the process and systems described above, substantially all of the carbon component of the fuel is conveyed as char into the burn-off reactor. This minimizes the carbon dioxide content of the syngas, and increases the efficiency and biofuel product production of the syngas to biofuel process. When operating in oxy-fuel mode, post power production, the cooled reduced pressure product stream of consisting substantially of steam, and trace gases with a minimum of carbon dioxide, is sent to a condensing scrubber where the stream is condensed and the trace gases are removed with this condensate. The resulting stream of essentially pure carbon dioxide is mixed with the carbon dioxide from the burn-off reactor.

The burn-off reactor gaseous product is substantially pure carbon dioxide in one embodiment where carbon dioxide is used as the fluidizing fluid. This carbon dioxide is mixed with the aforesaid carbon dioxide from the fuel reactor and is liquefied for sale or sequestration.

The electric energy and heat production equipment is the same for both gasification and oxy-fuel operation with the exception of the scrubbing condenser and carbon dioxide liquefaction equipment. Thus, greater than 95% (on a cost basis of the plant is common to the two modes of operation.

The hot, high pressure carbon dioxide stream is also used for the production of electric power and heat utilizing existing means such as turbo-expanders, and heat recovery steam generators. The turbo-expander is coupled to a carbon dioxide compression means to provide the compressed carbon dioxide needed to operate the burn-off reactor. The hot, high pressure oxygen depleted air stream also used for the production of electric power and heat utilizing existing means such as turbo-expanders, and heat recovery steam generators. The turbo-expander is coupled to an air compression means to provide the compressed air needed to operate the oxygen carrier regeneration reactor.

The means and equipment used for compression and for power generation and heat production is completely common to both modes of operation, since the oxygen carrier regeneration reactor operation is essentially the same for both modes.

The present system 200 is entirely self-sustaining on an energy basis. In oxy-fuel and gasification mode both reactors generate high temperature and pressure products for heat and power generation. In gasification mode, the fuel reactor is operated at the same or a lower temperature, 700 C in one example, relative to the oxygen carrier regeneration reactor, 875 C in the example. The solid oxygen carrier flowing from the oxygen carrier regeneration reactor give up sensible heat to the fuel reactor providing some of the energy need for gasification of the fuel. The remainder of the energy is provided by heat transfer from the gaseous products of the burn-off reactor. This method and process is superior to conventional oxygen blown gasification, since the carbon dioxide does not mix with and dilute the syngas product stream.

The method and means for switching between the two modes is to vary the amount of oxygen rich oxygen carrier stored in the accumulator 256 by varying the amount and pressure of the steam introduced through aeration pipes 226, 247, and 252. This method also controls the amount of solid material circulating in the fuel, burn-off and oxygen carrier regenerator loop, which is easily seen to be the total solids circulating in the system minus the solids stored in the accumulator. The amount of active components of solids circulating in the system, and the amount of active components, copper oxides in one embodiment, of oxygen rich oxygen carrier stored in the accumulator for both modes of operation is shown above.

The typical operating conditions of the oxygen carrier regeneration (air reactor are essentially the same for either fuel oxidation mode:

Oxygen Carrier Regeneration Reactor
Preferred Active Oxygen Carrier = CuO and $Cu_2O$

|  | Gasification Mode | Oxy-fuel Mode |
|---|---|---|
| Temperature | 875° C. | 875° C. |
| Pressure | 20 atmospheres | 20 atmospheres |
| Air to Active Components of Oxygen Depleted Carrier Ratio* | 4.3 kg/kg | 3.4 kg/kg |
| Product Gas Composition** |  | $O_2$ and $N_2$ |
| $O_2$ | 16.5% volume dry | 16.6% volume dry |
| $N_2$ | 83.5% volume dry | 84.4% volume dry |
| Exit Solids Composition |  |  |
| Oxygen Lean Oxygen Carrier |  |  |
| Oxygen Rich Oxygen Carrier |  |  |
| Char |  |  |
| Unreacted Fuel |  |  |
| Ash |  |  |

*Note: Includes air required for heat balance as well as air required for oxygen carrier regeneration
**Note: These compositions do not include the trace amounts of water, argon, and $CO_2$ which enter with the ambient air.

FIG. 3 schematically illustrates an overview of a system 300 in accordance with the present invention, including both apparatus and method. At a starting step 302, a carbonaceous fuel, solid, liquid, gas or mixture, such as biomass or biorefinery residue is introduced, at a step 304, into an air-independent internal oxidation (AIIO) reactor system. AIIO system 304 is capable of operation in either a gasification mode (Mode 1) or a production mode concentrating more particularly on combined heat and power (CHP) (Mode 2); these discrete modes are schematically illustrated at a step 306. Note that both modes produce heat and power, as illustrated at a step 308 (and with further specificity as step 332 for power production and 334 for heat production, which are further shown to be outputs of AIIO system 304).

From step 308, system 300 may be selectively operated in either of two optional modes, a Mode 1 312 or a Mode 2 320. That these are optional alternatives is schematically illustrated by the dashed lines indicating the branches.

If system 300 is selected to operate in Mode 1, the system shifts to a biofuel process 314, a catalytic process in the preferred embodiment. In this case, the reactor is operated in gasification mode and produces ethanol (or other biofuel) as the predominating end-product, as illustrated at step 318. Heat is also produced at a step 316.

If system 300 is selected to operate in Mode 2, the system shifts to operate as a direct contact condenser 322, producing condensed water at a step 324, and CO2 which goes on treatment, which include liquefaction in the preferred embodiment, at a step 326, resulting in liquid CO2 at a step 328, and heat, at a step 330.

FIG. 4 shows, in a schematic fashion, the feature of a novel system 400 for control of system parameters, in particular the solids flowing in, out, and through the system and carbonaceous fuel entering the aforesaid reactor system. Fuel 449 is introduced to a flow control assembly 450, comprising a flow controller 451, an actuator for said controller 452 responsive to a signal 453 received from the supervisory control system 499. This supervisory control system can be chosen from a set including, but not limited to, input output, adaptive, programmable logic, and model based control systems. Said system is a model-based control system in one embodiment, capable of receiving multiple input signals, processing them and sending multiple output signals to the system actuators to achieve desired results, including but not limited to, flows, temperatures, and pressures. FIG. 4 shows novel features of one embodiment, but some conventional signals are not shown. The signal received by the fuel flow control actuator 452 is a function of input demand signals chosen singly or multiply from a set comprising, but not limited to required heat, electric power, and syngas flow. The fuel then flows through a flow measurer and transmitter 402 which sends a signal in proportion to the flow to the control system. This feedback signal is compared with the desired flow and the fuel flow control signal 453 is adjusted until the difference between the desired flow and the measured flow reaches a programmed level. The fuel is then introduced to the fuel reactor 404 having a residence time $\tau_{FR}$ 431. This residence time is the average time that a particle spends in the fuel reactor before exiting through downcomer 432 and is constant in one embodiment. Oxygen-rich oxygen carrier is introduced to the fuel reactor via pipe 435 in proportion to the fuel. The amount and flow of this oxygen rich oxygen carrier is controlled in a manner described below using steam in one embodiment. The particles leaving the fuel reactor via downcomer 432 and entering the burn-off reactor, after a transit time $\tau_{FR-BOR}$ 424, are comprised of oxygen-rich oxygen carrier, oxygen-lean oxygen carrier, unreacted fuel, carbon, and char particles. The burn-off reactor 405 has a residence time $\tau_{BOR}$ 430, said residence time is constant in one embodiment. In addition to said particles, the burn-off reactor receives oxygen-rich oxygen carrier via pipe 434; the amount and flowrate of said oxygen rich oxygen carrier is controlled as discussed below. The particles leaving the burn-off reactor via downcomer 433 and entering the air reactor after transit time $\tau_{BOR-AR}$ 425 are comprised of ash, oxygen rich oxygen carrier and oxygen lean oxygen carrier. Air 436, compressed in one embodiment, is also introduced into the air reactor through flow control assembly 460 and flow measurer and transmitter 436 which operate in the manner describe for fuel flow to achieve a desired air flow amount and air flow rate in proportion to the said particles introduced via downcomer 433. The air reactor has a residence time $\tau_{AR}$ 431. Particles, comprised of oxygen rich oxygen carrier and ash, then flow from the air reactor via a pipe 443 and are introduced to a solids accumulator 407 after transit time $\tau_{AR-ACC}$ 423. In one embodiment, the solids accumulator is a vessel of sufficient active holding volume 419, taking into account the volume of oxygen-rich oxygen carrier required by fluctuations in flow rate required for stable operation, the volume of oxygen rich oxygen carrier required by fluctuations in flow rate required when selecting between operating mode requirements, and the volume of oxygen rich oxygen carrier required by simultaneous operating mode switching and stable operation. The amount of oxygen rich oxygen carrier held in the accumulator is monitored by a level transmitter 475 which inputs a signal 476 to the control system. It is a feature of the accumulator that the output flow rate is independent of the input flow rate so that each may fluctuate temporally with no effect on the other. This system and process enables operation in a mode chosen from any of full fuel oxidation, gasification, and transition. As will be appreciated by those skilled in the art, without the accumulator, stable operation in the event of large changes in fuel and other inputs cannot be achieved, as shown by the following example: Step 1: an increase in fuel input in response to control system output 453 demands an increase in oxygen rich oxygen carrier to maintain stable output. Step 2: The first L-Valve assembly directs some or the entire portion of the oxygen rich oxygen carrier entering from pipe 448 to the fuel reactor in response. Step 3: with no or insufficient oxygen rich oxygen carrier entering the burn-off reactor, oxidation of char, unoxidized fuel and ash components stops. Step 4: Said unoxidized components enter the air reactor, initiating flame combustion in air. Step 6: Said flame combustion of carbonaceous fuel components results in excessively high temperatures and undesirable emissions of carbon dioxide, other greenhouse gases, and pollutants to the atmosphere. With the accumulator, the process is as follows: Step 1: an increase in fuel input 453 demands an increase in oxygen rich oxygen carrier to maintain stable output. Step 2: The first L-Valve assembly directs the demanded portion of the oxygen rich oxygen carrier entering from 448 to the fuel reactor in response. Step 3: The amount of oxygen rich oxygen carrier stored in the accumulator decreases to supply the necessary amounts for the fuel reactor and the burn-off reactor. Step 3: An amount of oxygen rich oxygen carrier necessary for oxidation of char, unoxidized fuel and ash components is introduced to the burn-off reactor via a second L-Valve assembly. Step 4: No unoxidized components enter the air reactor, which operates in a normal manner. Step 6: There is no flame combustion of carbonaceous fuel components, no excessively high temperatures, and no undesirable emissions of carbon dioxide, other greenhouse gasses, and pollutants to the atmosphere. Further, with the accumulator in place, for smaller changes in fuel and other inputs, there is no delay in response time to said input demand. Without the accumulator, delays would result in system oscillations due to the multiplicity of residence times and transit times between the fuel input to the fuel reactor (demand) and oxygen rich oxygen carrier input to the first L-Valve assembly (response). With the accumulator in place, the amount of oxygen rich oxygen carrier in said accumulator simply fluctuates as required to respond to demand fluctuation. Therefore, fluctuations fuel and other inputs do not lead to feedback oscillation and other serious operational limitation and instabilities. Thus, this system and process prevents dynamic loop flow disturbances from propagating around the reactor system. A portion of the oxygen-rich oxygen carrier particles flow from said accumulator via pipe 448 and into a first L-Valve assembly 412. Oxygen-rich oxygen carrier in a desired proportionality to the fuel 402 is sent to the fuel reactor via pipe 435 flowing through flow measurer and transmitter 413 which sends a signal in a proportional relation to the supervisory control system. The amount and flow rate of said oxygen rich oxygen carrier is controlled by a motive fluid 404 which flows through a flow control assembly 470 then through a flow measurer and transmitting assembly 410 these assemblies operate as described above to introduce a controlled amount of the motive fluid into the L-Valve assembly. This motive fluid induces an oxygen-rich carrier flow in proportion to said motive fluid flow into the fuel reactor as described above. By this system and process, the ratio of oxygen rich oxygen carrier to the fuel may be controlled to a desired value. For operation in a gasification mode, the ratio is maintained within a range of 0-3 in one embodiment. For operation in a full oxidation mode, the ratio is maintained within a range of 4-10 in one embodiment. Said ratio is increased or decreased as appropriate to transition between modes. The controlled ratios are in a functional relation to fuel reactor parameters selected from a set comprising, but not limited to, residence time, temperature and pressure. Constant residence time, in one embodiment, results in a desired simplicity of control system design, programming, operation, and cost.

A portion of the oxygen rich oxygen carrier entering the L-Valve assembly (which can include multiple L valves) is introduced to the first L-Valve assembly 412, via steam in one embodiment, the remainder of the oxygen rich oxygen carrier flows to a second L-Valve assembly 417. There, as described above, a portion of the flow is sent to the burn-off reactor via pipe 434 through the control of a motive fluid, carbon dioxide 446 in one embodiment. Said portion is controlled in a ratio to the char, any unoxidized fuel, and unoxidized ash forming components, such that all of said components are completely oxidized prior to leaving the burn-off reactor. A final portion of the oxygen rich oxygen carrier and bottom ash is conveyed from a second L-Valve assembly to a third L-Valve assembly, where it flows to a treatment system comprised of conventional components including but not limited to froth flotation units, filters, pumps, and settling tanks. The flow of this final portion of oxygen rich oxygen carrier and ash to said treatment system is accomplished using a controlled flow of a motive fluid 428, steam in one embodiment. The amount and flowrate of this motive fluid is controlled as described above. The supervisory control system may be operated to perform said operations and actions automatically or in response to manual operator inputs.

FIGS. 5A, 5B, 5C, 5D and 5F depict more detailed embodiments of a system 500.

Figure 1:
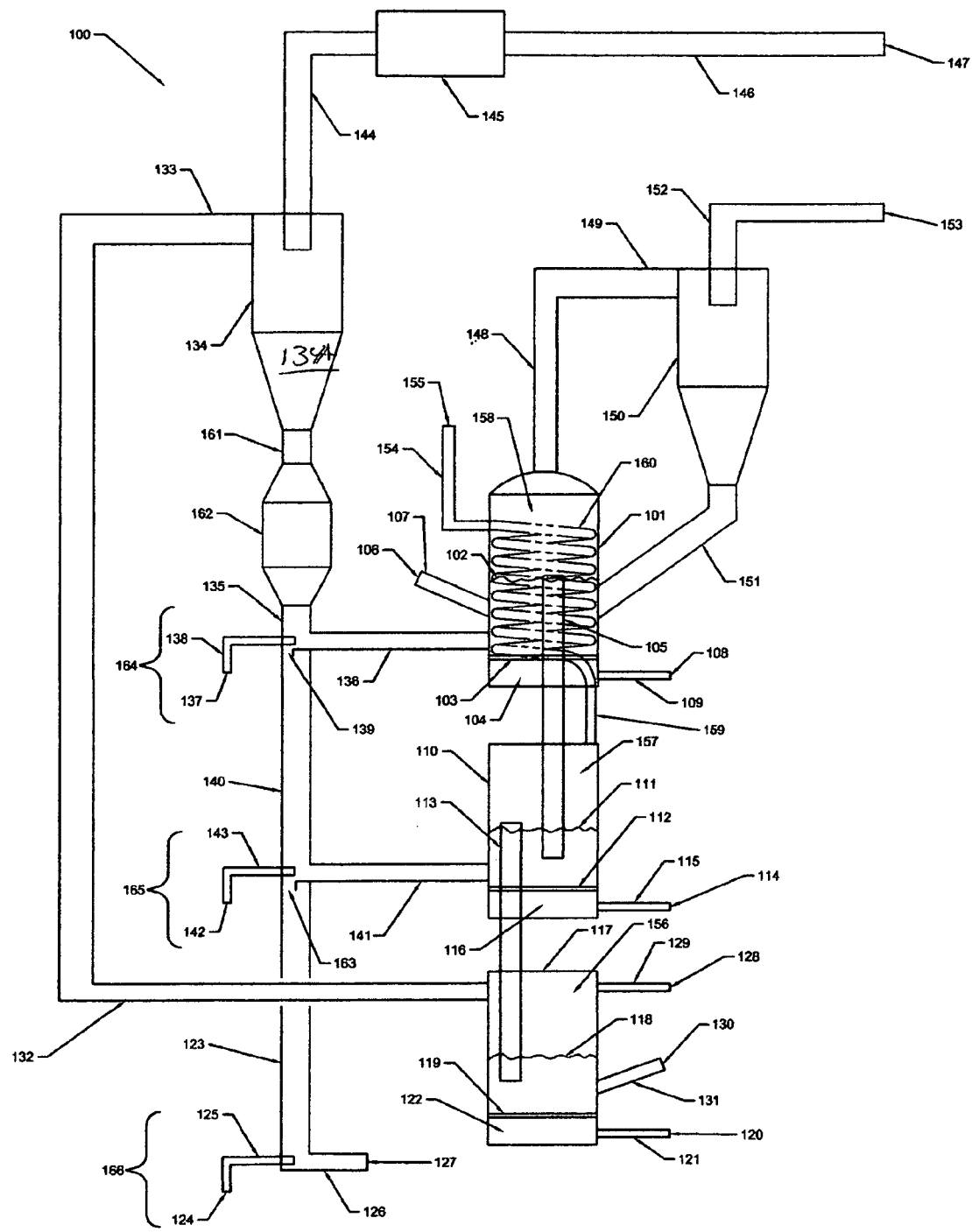
Figure 1A:
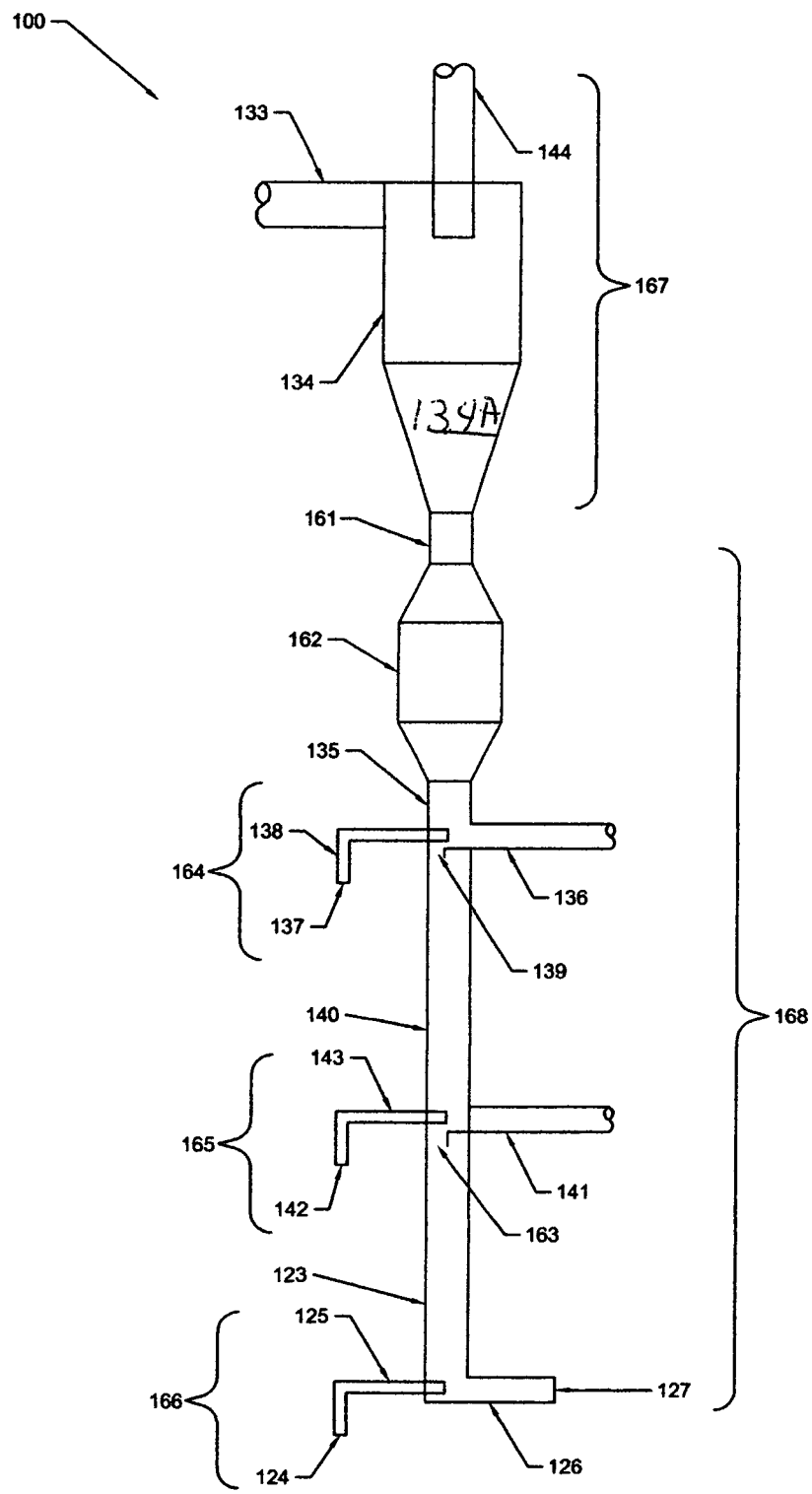
Figure 1C:
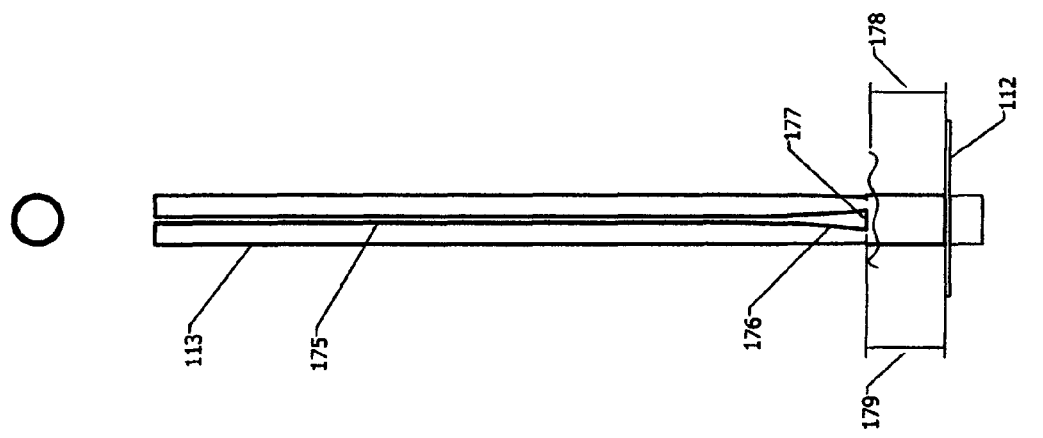
Figure 1B:
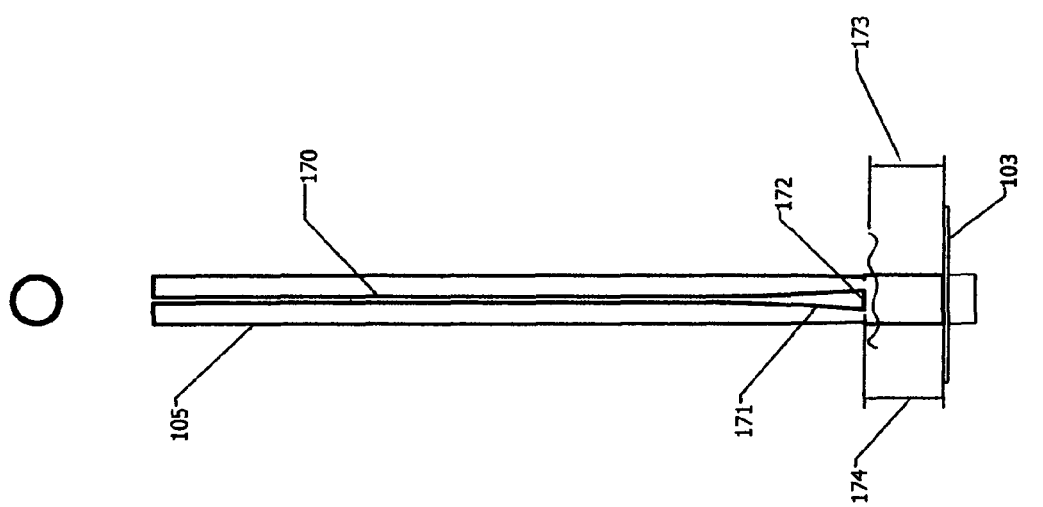
Figure 2:
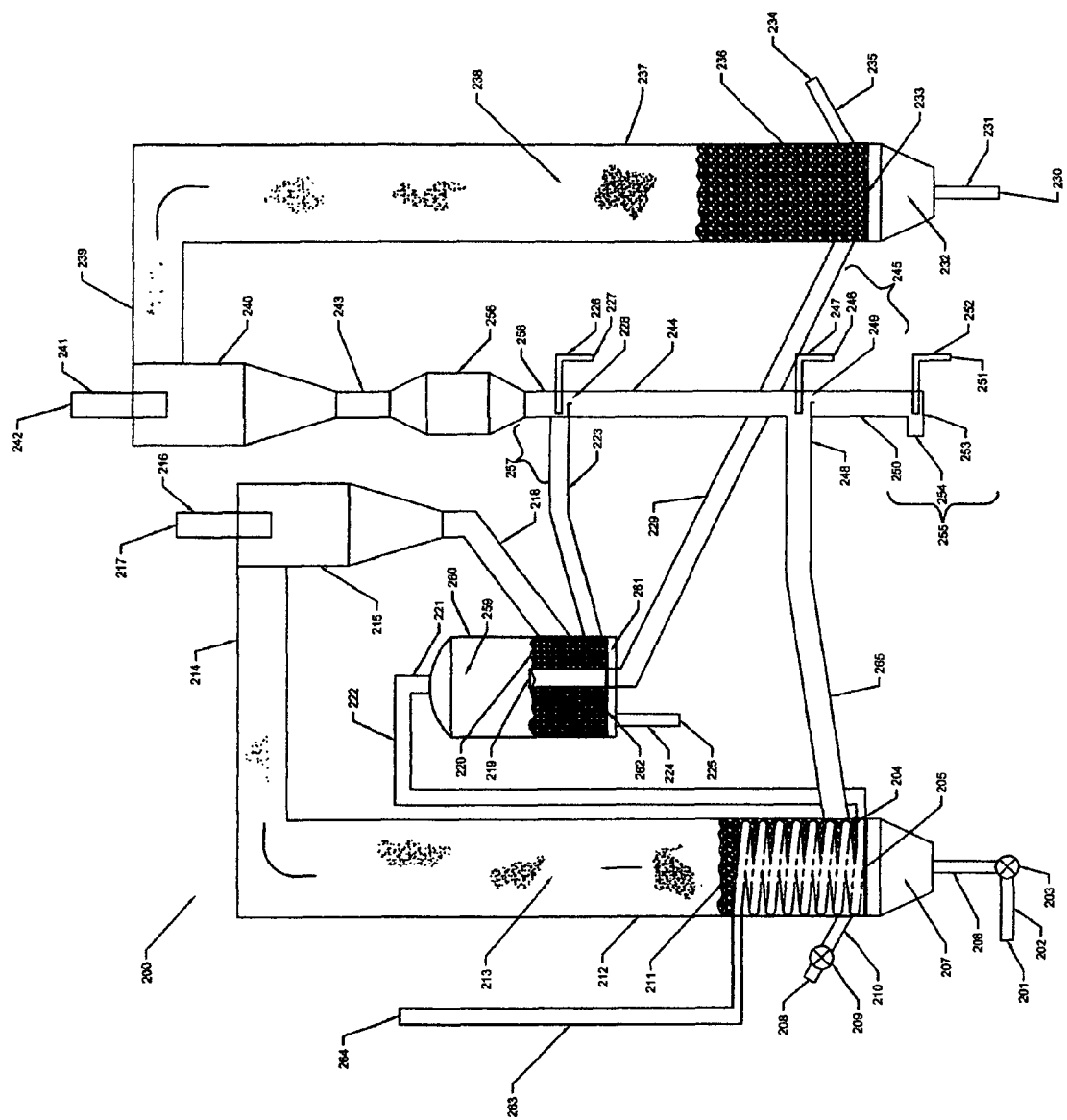
Figure 3:
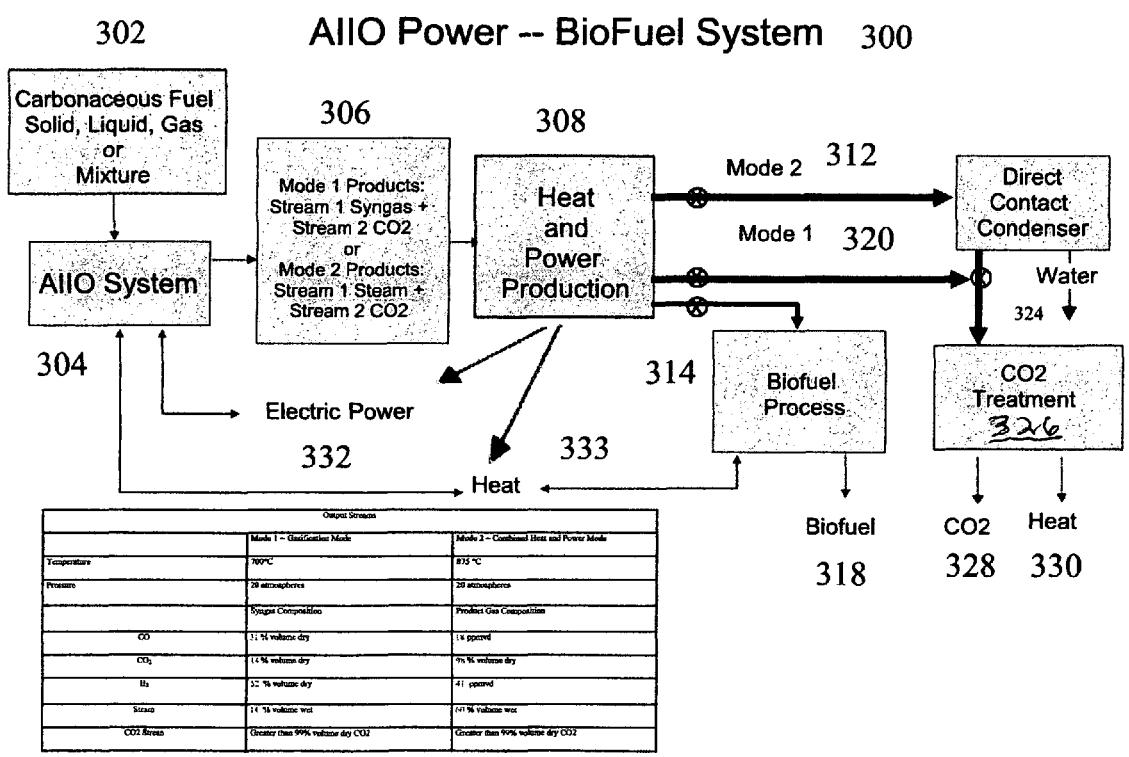
Figure 4:
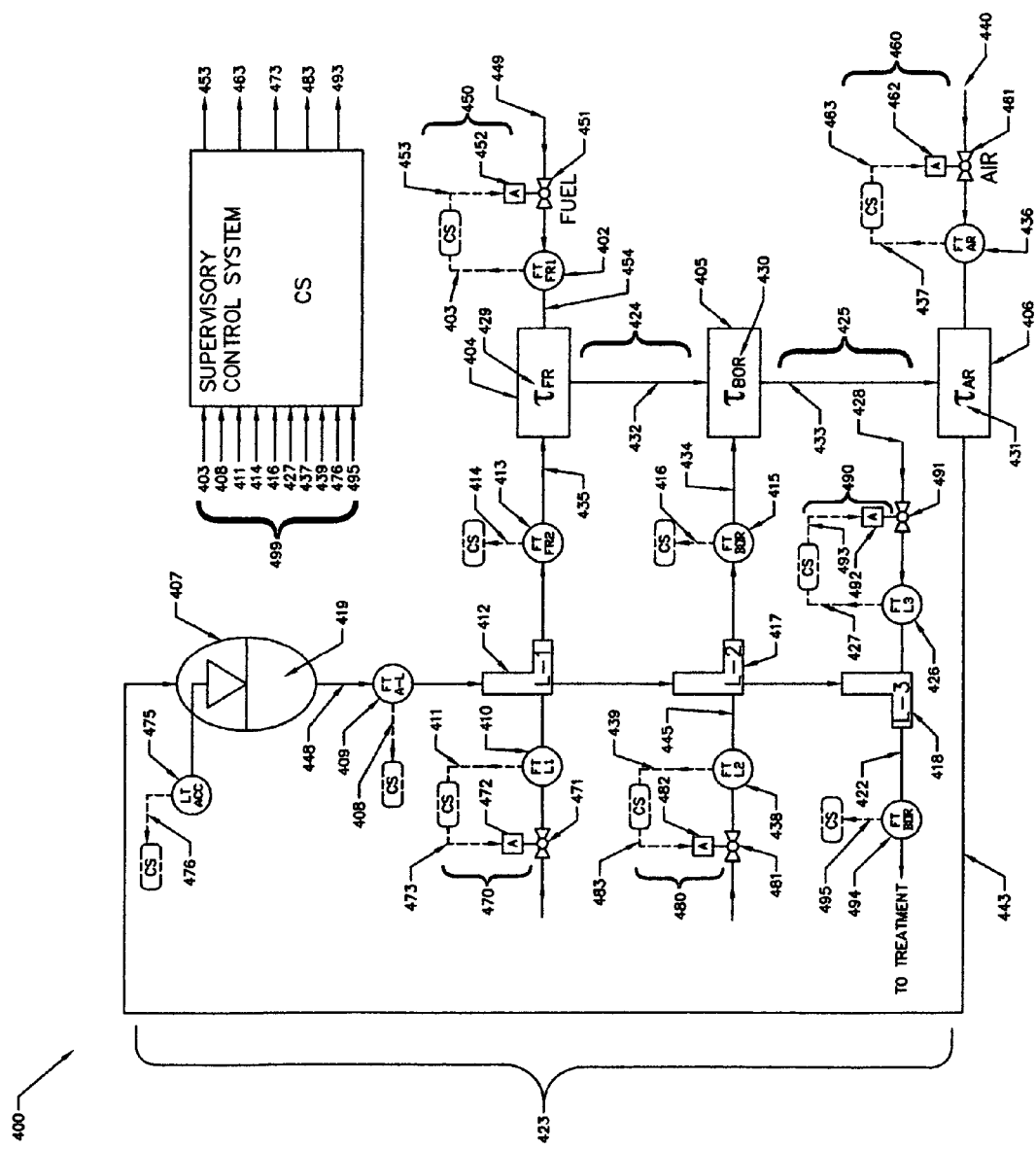
Figure 5A:
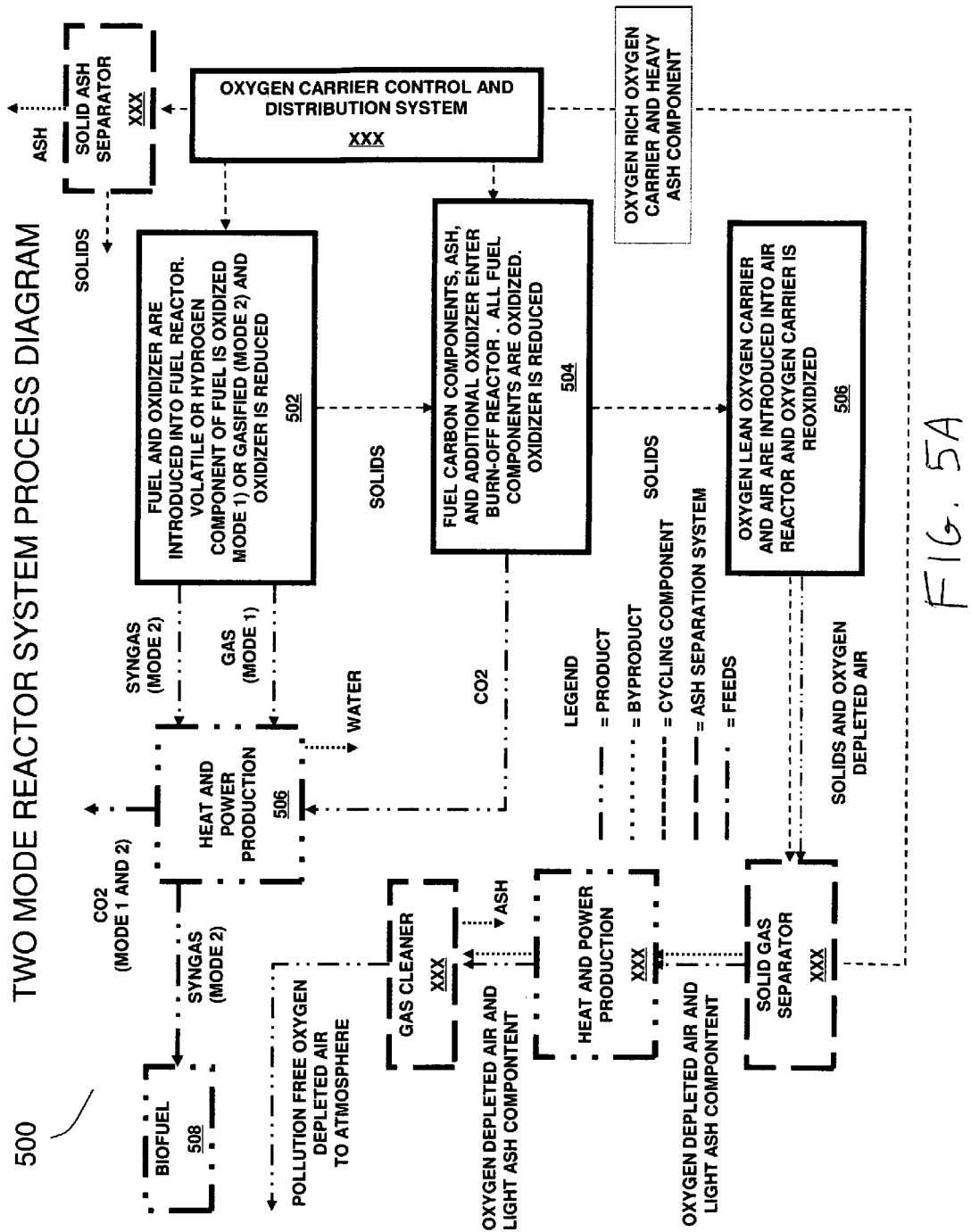
Figure 5C:
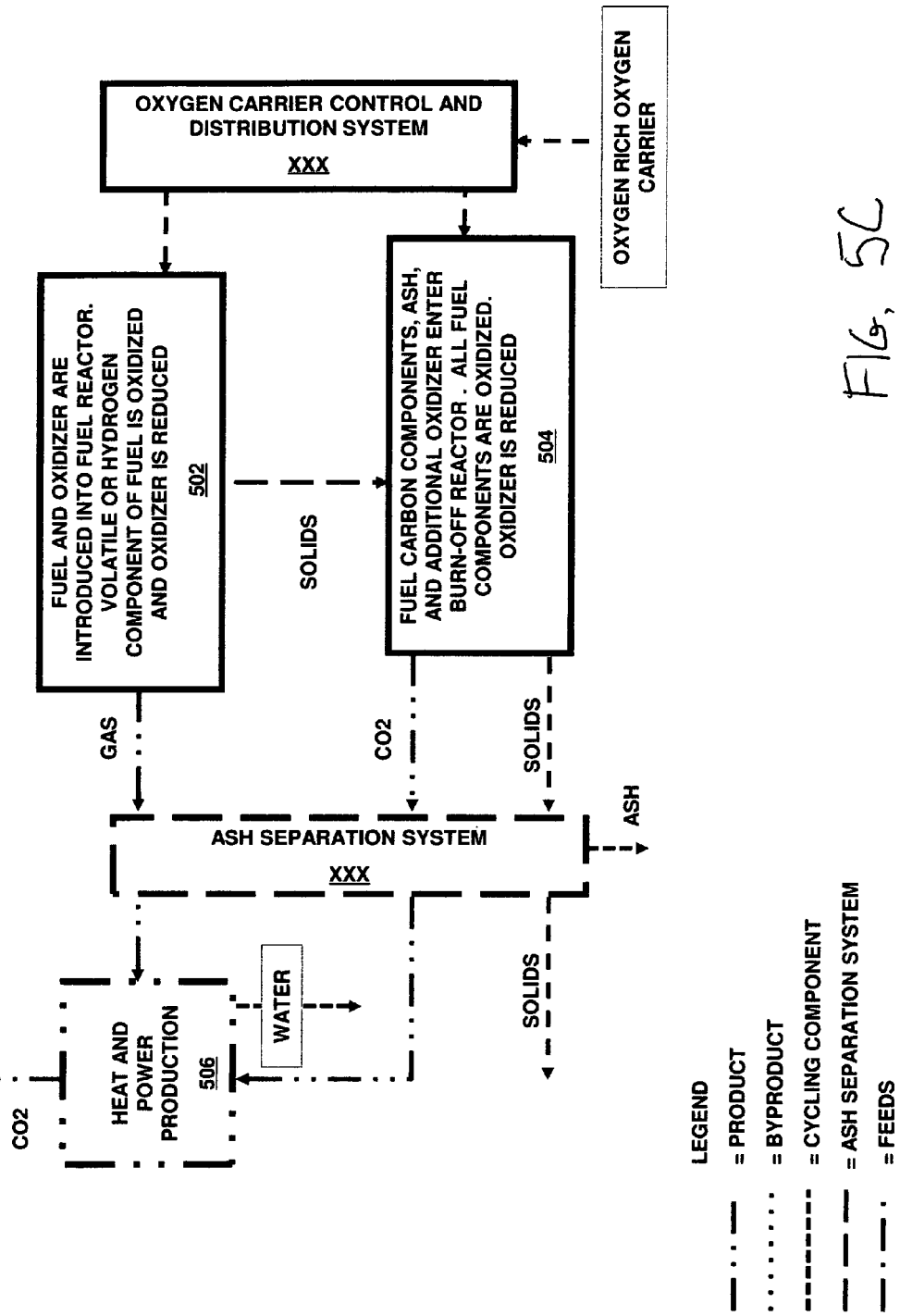
Figure 5E:
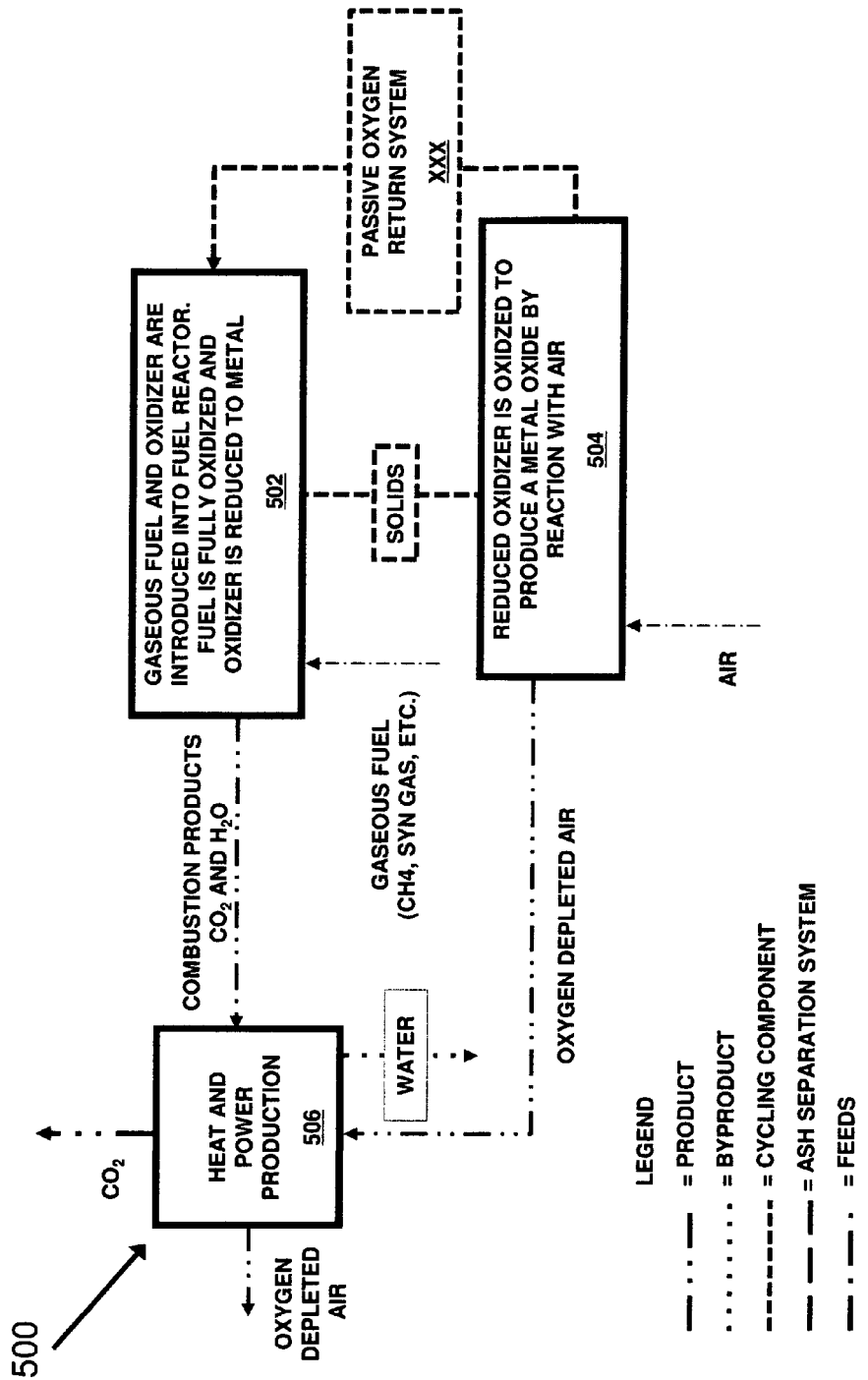
FIG. 5E depicts a biofuel reactor system of the related art.
Figure 5F:
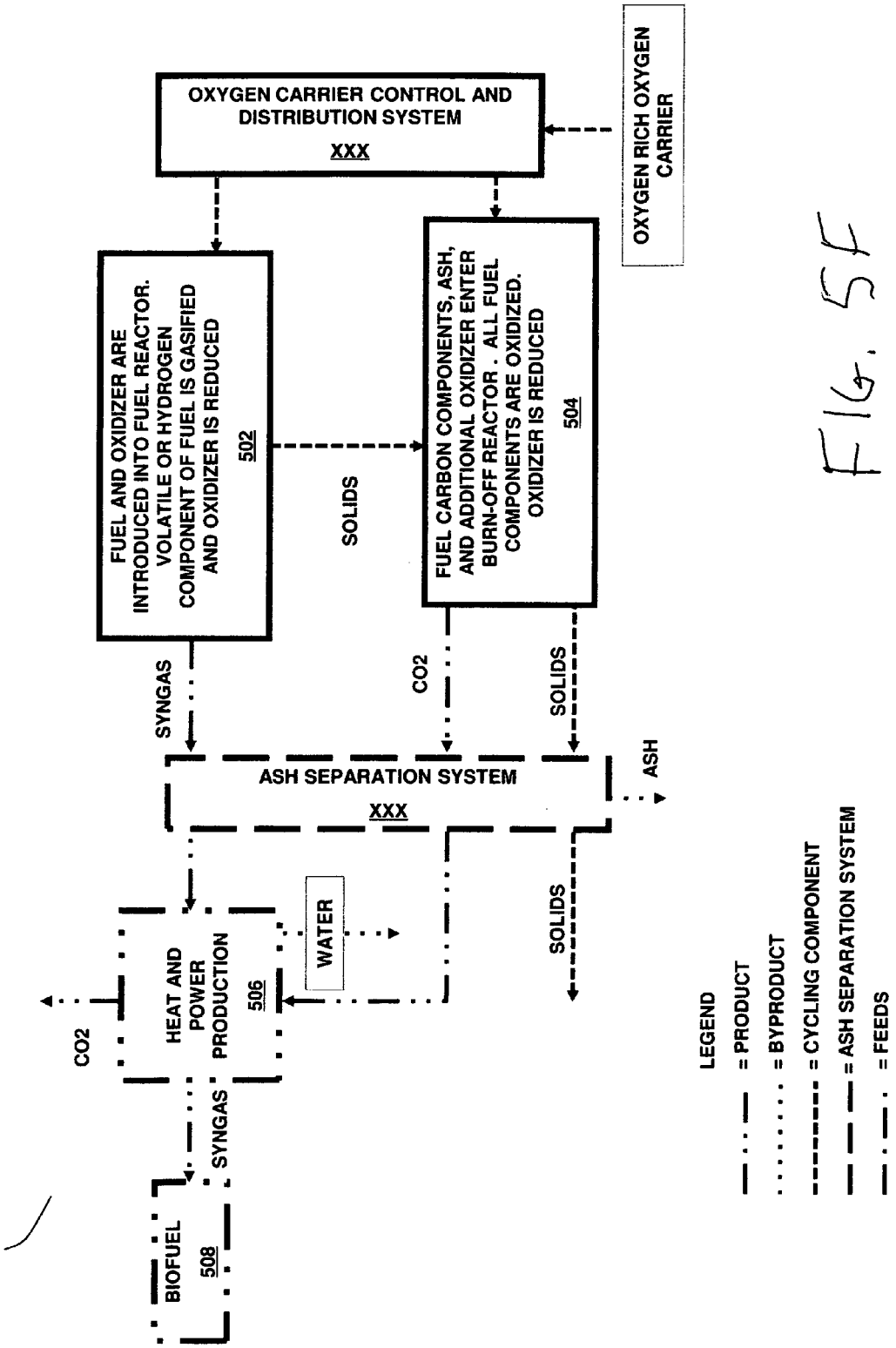

In the preceding specification various embodiments and aspects of the present invention have been described with reference to specific examples thereof. It will, however, be evident that various modifications and changes may be made without departing from the broader spirit and scope of the present invention as set forth in the claims that follow. The specification and drawings are accordingly to be regarded in an illustrative rather than restrictive sense.

What is claimed is:

1. A reactor system comprising a fuel reactor, said fuel reactor comprising a carrier bed that includes an oxygen carrier for oxidizing fuel, said oxygen carrier in said reactor oxidizing fuel in either a full-oxidation mode or a partial-oxidation mode, said fuel reactor primarily producing gases for the production of combined heat and power when operated in said full-oxidation mode and primarily producing syngas when operated in said partial-oxidation mode, said reactor system further comprising a burn-off reactor for substantially complete oxidation of fuel, wherein partially oxidized fuel is transferred from said fuel reactor to said burn-off reactor to complete oxidation wherein said fuel reactor and said burn-off reactor can be operated simultaneously, said fuel reactor operating in partial oxidation mode so that said fuel reactor produces syngas and combined heat and power while said burn-off reactor produces gases for the production of combined heat and power, further wherein at least a portion of oxygen-lean carrier from said burn-off reactor can be transferred to a regeneration reactor where said portion of oxygen-lean carrier can be reoxygenated to produce oxygen-rich carrier, further wherein at least a portion of said oxygen-rich carrier can be transferred back to said fuel reactor, and further wherein at least a portion of said oxygen-rich carrier is held in an accumulator before being transferred to said fuel reactor.

2. A reactor system in accordance with claim 1 in which the burn-off reactor can be operated in a partial-oxidation mode.

3. A reactor system in accordance with claim 1 wherein operation of said burn-off reactor is selectable between full-oxidation mode and partial-oxidation mode.

4. A reactor system in accordance with claim 1 wherein the fuel reactor can be operated in full-oxidation mode and partial-oxidation mode in alternation.

5. A reactor system in accordance with claim 1 further including a regeneration reactor for reoxidation of said oxygen carrier.

6. A reactor system in accordance with claim 1 in which the carrier bed is fluidized.

7. A reactor system in accordance with claim 1 in which the oxygen carrier is a metal oxide.

8. A reactor system in accordance with claim 7 in which the metal in the metal oxide is chosen from the set of barium, copper, and manganese.

9. A reactor system in accord with claim 1 in which said portion of partially oxidized fuel transferred to said burn-off reactor is controlled via an outlet opening or openings, the profile of said opening or openings being chosen so as to regulate the residence time of the fuel in the reactor by regulating the amount of said solids held in the reactor.

10. A method for production of syngas or combined heat and power in a reactor system, comprising the steps of:

feeding fuel into a fuel reactor, said fuel reactor comprising a carrier bed that includes an oxygen carrier for oxidizing fuel;

the oxygen carrier in the fuel reactor oxidizing fuel in either of a full-oxidation mode or a partial-oxidation mode so that when the fuel reactor is operated in full-oxidation mode, the fuel reactor produces gases for the production of combined heat and power, and when the fuel reactor is operated in partial-oxidation mode, the fuel reactor produces syngas further comprising the steps of:

transferring at least a portion of partially consumed fuel along with oxygen carrier to a burn-off reactor;

said oxygen carrier substantially completely oxidizing said transferred partially consumed fuel so as to produce combined heat and power;

reoxygenating said oxygen-lean carrier to produce oxygen-rich carrier;

transferring at least a portion of said oxygen-rich carrier back to said fuel reactor in which at least a portion of said oxygen-rich carrier is held in an accumulator before being transferred to said fuel reactor.

11. A method in accordance with claim 10 wherein the outlet of the accumulator is profiled.

12. A method in accordance with claim 10 further including the step of:

selecting said more of said burn-off reactor between full-oxidation mode and partial-oxidation mode.

13. A method in accordance with claim 10 further including the step of:

alternating the operation of said fuel reactor between full-oxidation mode and partial oxidation mode.

\* \* \* \* \*